3,013,065
PREPARATION OF LOWER ALKYL CARBAMATES WITH INTERRUPTED EFFLUENT FLOW

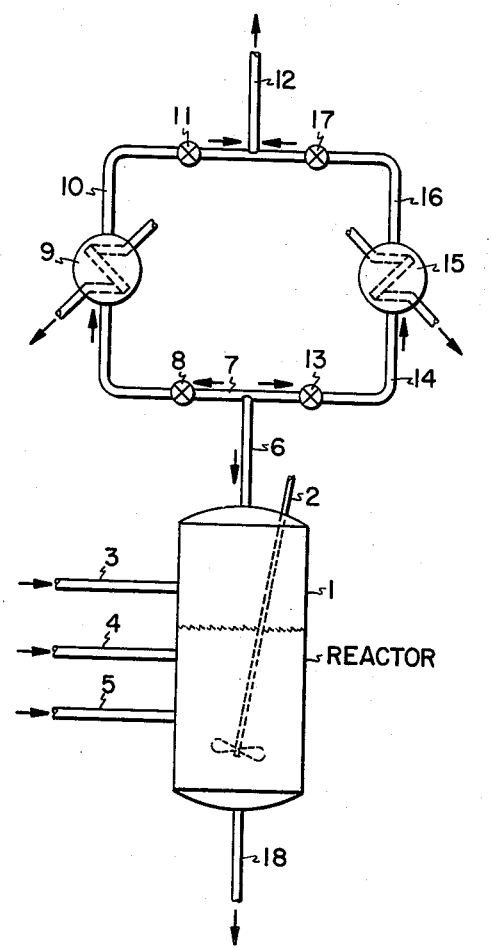

Sidney Beinfest, Berkeley Heights, and Joseph Halpern, New Providence, N.J., assignors to Berkeley Chemical Corporation, Berkeley Heights, N.J., a corporation of New Jersey
Filed June 3, 1960, Ser. No. 33,735
6 Claims. (Cl. 260—482)

This invention relates to new and useful improvements in the preparation of lower alkyl carbamates. More particularly, it relates to the preparation of these materials by a process in which the flow of effluent vapors is conducted through a plurality of heat exchange zones.

This application is a continuation-in-part of United States Ser. No. 14,147, filed March 10, 1960.

Alkyl monocarbamates such as ethyl carbamate have been finding increasing utility both as medicinals themselves and particularly as reactants in the preparation of alkanediol dicarbamates, a promising class of "tranquilizing" drugs as well as other uses.

These materials have been prepared by reacting lower alkanols with urea both non-catalytically and with a catalyst; see our United States Patent 2,837,561, which discloses catalysts such as cupric salts of carboxylic acids. Other salts such as aluminum alkoxides, ammonium acetate, zinc, manganese, tin, cobalt and nickel salts can be used. Anions other than those listed including borates formates, chlorides, oxalates and oxides can also be used. Related organo-metallic compounds can be used. Promoters such as alkali and alkaline earth salts of organic acids have also been found useful.

This reaction proceeds readily at about 125° C. or above. In case of higher alcohols it can be carried out at atmospheric pressure. For the lower alcohols, to reach the desired temperature, pressure equipment is necessary.

The literature methods thus teach employing an autoclave with no provision for ammonia removal. Attempts to remove the ammonia-containing vapors in the effluent system have been characterized by deposition of condensation products with plugging of equipment and process shut-downs. Additionally, alcohol losses can be high. The increased use of the lower alkyl monocarbamates thus depends on an improved method of preparing them.

This invention provides an improved process for treating the effluent vapors from the reaction of the lower alkanols with urea. The method comprises cooling the effluent vapors to condense the alkanol in a first heat exchange zone. The flow of vapors to the first heat exchange zone is interrupted and the additional effluent vapors are sent to a second heat exchange zone, wherein they are cooled to condense the alkanol. The uncondensed ammonia-containing gases are vented and the condensed alkanol returned to the reaction zone. Further details are as follows.

The lower alkanols that can be employed are the $C_1$ to $C_3$ alkanols and thus include methanol, ethanol, propanol, isopropanol, and mixtures thereof. They are preferably employed in the anhydrous form available. The amount of alkanol utilized is about 1.1–3 mol/1 mol urea.

The reaction temperature utilized is conveniently in the range of about 130–155° C. with pressures correspondingly in the range of 3–10 atmospheres absolute.

The catalysts when employed are utilized in an amount of about 0.001–0.1 mol/mol urea.

As stated previously, alcohol losses are minimized and shutdowns prevented by sending the effluent vapors through a plurality of heat exchange zones, with the flow to the first being interrupted or shut down when the effluent vapors are sent to the second. The second one is then shut down while the vapors are sent back to the first, or a third heat exchange zone. For simplicity, the discussion is directed to the use of two heat exchange zones, but as stated, a plurality can be employed.

The effluent vapor containing alkanol, ammonia, some $CO_2$ and other gases is cooled in the heat exchange zone, e.g., a cold condenser to a temperature in the range of about −20 to 25° C., depending on the cooling media readily available. By using a plurality of cold condensers instead of a single hot condenser, the quantity of ethanol condensed will be approximately 500 lbs. greater for every ton on urea charged. Similar controls are utilized with the effluent vapors sent to the second heat exchange zone when the flow is interrupted to the first. The residual gases, after alkanol condensation, are vented and the alkanol returned to the reaction zone.

The controls on determining when to shut down one heat exchange zone are empiric in nature, so as to avoid complete process shutdown. They thus are based on the increase in temperature of the effluent vapors downstream of the heat exchange zone, the increase in pressure drop across the heat exchange zone, or on a time cycle based on equipment size and the amount of materials handled.

The heat exchange zone when shut down can be regenerated, i.e., steamed or heated in any other manner above about 60° C. while off-stream to place it in condition for reuse.

This invention and its advantages will be better understood by reference to the following examples and flow diagram.

Example I

Referring to the flow diagram, into reactor 1 are charged 600 gms. of urea through line 3, 1450 cc. of ethanol through line 4 and 40 gms. of cupric acetate through line 5. The mixture is maintained at 140° C. and stirred by agitator 2. The pressure is 5–6 atmospheres absolute. The overhead mixture in line 6 contains alcohol vapors, ammonia, some $CO_2$ and other gases. The effluent vapors flow through lines 6 and 7 and valve 8 into heat exchanger 9. The vapors are indirectly cooled with water at a temperature of 14° C. to a temperature of 20° C., resulting in condensation of a substantial portion of ethanol. The ethanol lost in the exit gas is about 2 gms. as compared to the ethanol loss of about 115 gms. when the temperature of the gas leaving the condenser is 90° C. The ethanol returns to the reaction zone 1 through the preceding lines. The uncondensed gases flow through line 10 and control valve 11 and are vented through line 12.

The increase in temperature in the gases in line 10 indicates that it is time to interrupt the flow of vapors to heat exchange zone 9. Valve 8 is accordingly closed to interrupt the flow of effluent vapors and they consequently now flow through lines 6, 7, 14 and valve 13 to heat exchanger 15. A similar operation takes place in heat exchange zone 15 as in heat exchange zone 9 and the uncondensed gases are discharged through line 16, control valve 17 and line 12. After completion of the reaction, the product contained in the ethanol is discharged through line 18 to an auxiliary still, not shown, for purification.

Line 6 may advantageously be a fractionating column. The heat exchanger 9 is heated with live steam so it can be placed on stream again.

Example II

The same charge as in Example I is fed to a similar system except only one heat exchange zone is employed. After a period of time the surface becomes coated with solid reducing the heat transfer. This raises the temperature of the departing effluent gases. The heat exchanger finally becomes plugged, causing a pressure drop across it and making it necessary to shut down the system. This should be contrasted with the smooth operation of this invention as described in Example I.

*Example III*

This example is run in an identical manner as in Example II but the water employed in the heat exchange zone is at 90° C. to prevent solids deposition. The reaction is completed without plugging, but ethanol losses are 115 gms. as contrasted to the 2 gms. loss of Example I.

In addition to the lower alkanols listed, this process can also be applied to the use of allyl alcohol and mixtures of the lower alkanols. Conditions can be varied somewhat, e.g., higher and somewhat lower reaction temperatures can be used with corresponding variations in other conditions.

It can be advantageous to maintain overhead withdrawal lines at temperatures above 60° C. as described in the parent application. Thus, e.g., lines 10, 11, 12, 16 and 17 can be so maintained.

If desired the process of the parent case can be integrated with this one, i.e., using the process of the former followed by the latter.

The advantages of this invention will be apparent to the skilled in the art. Equipment and process shut-downs are avoided and alcohol losses are minimized. Since the alcohol content of the vented gases is sharply reduced, these gases can be collected in water and useful ammonia solutions can be recovered.

It is understood that this invention is not limited to the specific examples which have been offered merely as illustrations and that modifications may be made without departing from the spirit of the invention.

What is claimed is:

1. In a process for preparing a lower alkyl carbamate by reacting a $C_1$-$C_3$ alkanol with urea wherein alkanol containing effluent vapors are withdrawn from the reaction zone, the improvement which comprises the steps of cooling the effluent vapors to condense the alkanol in a first heat exchange zone; interrupting the flow of additional effluent vapors to the first heat exchange zone; sending additional effluent vapors to a second heat exchange zone wherein they are cooled to condense the alkanol; venting uncondensed gases and returning the condensed alkanol to the reaction zone.

2. The process of claim 1 in which the alkanol is ethanol.

3. The process of claim 1 in which the alkanol is methanol.

4. The process of claim 1 in which the alkanol is isopropanol.

5. The process of claim 1 in which a mixture of lower alkanols is employed.

6. The process of claim 1 in which a reaction temperature of about 130–155° C. is employed and the effluent vapors are cooled to a temperature in the range of about −20 to 25° C.

References Cited in the file of this patent

UNITED STATES PATENTS 2,837,561     Beinfest et al. _____ June 3, 1958